United States Patent
Bosch et al.

(10) Patent No.: US 8,296,584 B2
(45) Date of Patent: Oct. 23, 2012

(54) STORAGE AND RETRIEVAL OF ENCRYPTED DATA BLOCKS WITH IN-LINE MESSAGE AUTHENTICATION CODES

(75) Inventors: Peter Bosch, New Providence, NJ (US); Hubert Rae McLellan, Jr., Summit, NJ (US); Sape Jurriën Mullender, North Plainfield, NJ (US)

(73) Assignee: Alcatel Lucent, Paris (FR)

( * ) Notice: Subject to any disclaimer, the term of this patent is extended or adjusted under 35 U.S.C. 154(b) by 1332 days.

(21) Appl. No.: 11/966,101

(22) Filed: Dec. 28, 2007

(65) Prior Publication Data

US 2009/0172416 A1    Jul. 2, 2009

(51) Int. Cl.
*H04L 9/06* (2006.01)
*H04L 9/32* (2006.01)
*G06F 12/14* (2006.01)

(52) U.S. Cl. ............................................. 713/193; 726/2
(58) Field of Classification Search ................... 713/193; 726/2

See application file for complete search history.

(56) References Cited

U.S. PATENT DOCUMENTS

2004/0117562 A1* 6/2004 Wu et al. ........................ 711/147
2008/0117679 A1* 5/2008 Srinivasan et al. ........ 365/185.04

OTHER PUBLICATIONS

R. Elbaz et al., "Hardware Engines for Bus Encryption: a Survey of Existing Techniques," IEEE, Proceedings of the Design, Automation and Test in Europe Conference and Exhibition, 2005, 6 pages.
G.E. Su-h et al., "Efficient Memory Integrity Verification and Encryption for Secure Processors," IEEE, Proceedings of the 36th International Symposium on Microarchitecture, 2003, 12 pages.

* cited by examiner

*Primary Examiner* — Jason K. Gee
*Assistant Examiner* — Aubrey Wyszynski
(74) *Attorney, Agent, or Firm* — Ryan, Mason & Lewis, LLP

(57) ABSTRACT

Techniques are disclosed for in-line storage of message authentication codes with respective encrypted data blocks. In one aspect, a given data block is encrypted and a message authentication code is generated for the encrypted data block. A target address is determined for storage of the encrypted data block in a memory. The target address is then modified to permit in-line storage of the message authentication code with the encrypted data block in the memory, and the encrypted data block and the message authentication code are transferred to the memory for storage at the modified address. Illustrative embodiments of the techniques advantageously facilitate secure off-chip storage of data in a processing system.

21 Claims, 4 Drawing Sheets

N WORD BLOCKS → N+1 WORD BLOCKS $$A' = \frac{N+1}{N} A$$

STORAGE AND RETRIEVAL OF ENCRYPTED DATA BLOCKS WITH IN-LINE MESSAGE AUTHENTICATION CODES

FIELD OF THE INVENTION

The present invention relates generally to processing systems and more particularly to techniques for storing and retrieving encrypted data blocks in such systems.

BACKGROUND OF THE INVENTION

A typical processing system may utilize an external memory for data storage. For example, such a system may be implemented as a system on a chip (SOC) which comprises a processor that accesses both on-chip and off-chip memory. Secure computation can be achieved if the software is secure and the associated instructions and data remain entirely on-chip and are not exposed to external view. But once data is transferred off-chip, it becomes vulnerable to attack and the security of a given computation may be compromised. For example, an adversary could obtain access to an unprotected off-chip memory and examine the stored data, possibly detecting secret information. The adversary could even modify the stored data and thereby subvert an otherwise secure computation.

These security issues are generally addressed by encrypting data prior to its storage in an off-chip memory or other external memory of a processing system. However, encryption alone may provide insufficient protection against a determined adversary. For example, such an adversary could modify the encrypted data, and the modified encrypted data could later be retrieved by the processor, decrypted and accepted as valid.

It is well known that storage of a digital signature can allow detection of this type of tampering with encrypted data. The signature is an example of what is more generally referred to herein as a message authentication code (MAC). A MAC is generated from the encrypted data prior to storage, and upon retrieval of the encrypted data, another MAC is generated from the retrieved encrypted data and compared with the original MAC. If the encrypted data has been modified while stored in the external memory, the second MAC will not agree with the first, and the processor can determine whether to accept or reject the retrieved encrypted data based on such a determination.

A problem that arises in conventional processing systems that store encrypted data relates to storage of the original MAC generated for the encrypted data. A typical approach is to store the MAC separately from the corresponding encrypted data. However, such an approach is inefficient in that multiple accesses to the external memory are generally required in order to retrieve both the encrypted data and its associated MAC from the external memory, even if the encrypted data itself comprises only a relatively small block of data that could otherwise be easily retrieved in a single access to external memory.

SUMMARY OF THE INVENTION

Illustrative embodiments of the present invention provide enhanced efficiency in the storage and retrieval of encrypted data blocks and associated MACs in a processing system. These embodiments considerably reduce the processing overhead associated with storage and retrieval of encrypted data by implementing an address modification technique that allows MACs to be stored in-line with respective encrypted data blocks.

In accordance with one aspect of the invention, a given data block is encrypted and a MAC is generated for the encrypted data block. A target address is determined for storage of the encrypted data block in a memory, which may be an off-chip memory of an SOC or other processing system. The target address may be, for example, an address as specified in an instruction or other storage request that directs storage of only the encrypted data block. The target address is then modified to permit in-line storage of the MAC with the encrypted data block in the memory, and the encrypted data block and the MAC are transferred to the memory for storage at the modified address. This process is repeated for other encrypted data blocks and their associated MACs, resulting in an in-line storage arrangement in which encrypted data blocks are interspersed with the MACs. Such an arrangement permits particularly efficient storage and retrieval of a given encrypted data block and its associated MAC, for example, utilizing one or more burst transactions.

In an illustrative embodiment, the modification of the target address comprises adjusting that address by a factor given by:

$$\frac{N+M}{N},$$

where N denotes the number of k-bit elements in the encrypted data block, and M denotes the number of k-bit elements in the MAC, where k is a power of 2. As a more particular example, in one embodiment k=32, N=8 and M=1, such that the first address is modified by multiplying it by nine and dividing the result by eight. This exemplary modification can be achieved using only a single addition along with appropriate bit-shifting operations.

The illustrative embodiments facilitate the in-line storage of MACs with encrypted data blocks in an external memory of a processing system, and thereby reduce the processing overhead associated with storing and retrieving such information.

DETAILED DESCRIPTION OF THE INVENTION

The invention will be described herein in conjunction with illustrative embodiments of processing systems and associated secure off-chip storage techniques. It should be understood, however, that the invention is not limited to use with the particular processing systems and techniques described, but is instead more generally applicable to any type of processing system application in which it is desirable to provide improved performance in the storage and retrieval of encrypted data.

The term "message authentication code" or MAC as used herein is intended to be construed generally so as to encompass, for example, any type of cryptographic information suitable for ensuring integrity of encrypted data. The invention does not require the use of any particular type of MAC, or any particular type of MAC generation or verification.

Figure 1:
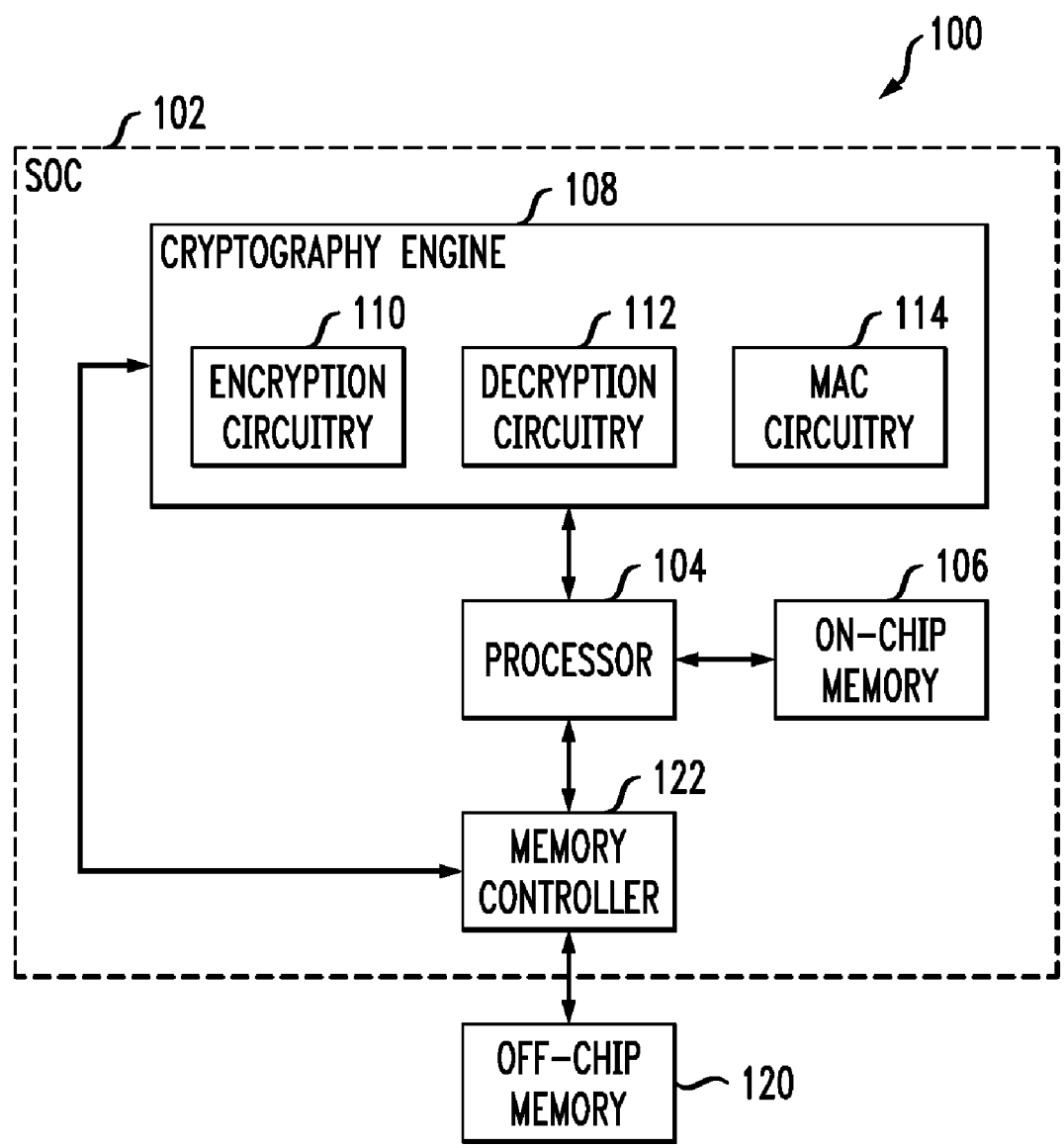
FIG. 1 shows an illustrative embodiment of a processing system in which the present invention is implemented.

FIG. 1 shows an illustrative embodiment of a processing system 100. The system 100 comprises an SOC 102 that includes a processor 104, an on-chip memory 106 and a cryptography engine 108. The cryptography engine 108 includes encryption circuitry 110, decryption circuitry 112 and MAC circuitry 114. The processor 104 controls the operation of the cryptography engine 108, and is also configured to store information in and retrieve information from both the on-chip memory 106 and an off-chip memory 120. The processor 104 communicates with the off-chip memory 120 via a corresponding memory controller 122. The memory controller interacts with the cryptography engine 108 in encrypting data blocks for storage in the off-chip memory and decrypting encrypted data blocks retrieved from the off-chip memory.

The memory 120 is referred to herein as an "off-chip" memory in that this memory is not part of the chip that implements the SOC 102. Accordingly, it may be implemented using one or more chips that are separate from the SOC. In an arrangement of this type, the SOC itself may be viewed as a zone of trust, with the off-chip memory being outside of this zone of trust. As noted previously herein, in conventional systems, once data is transferred off-chip, such data becomes vulnerable to attack and the security of the overall system may be compromised. Aspects of the present invention address this problem by providing techniques for secure off-chip data storage.

Although the processor 104, on-chip memory 106, cryptography engine 108 and memory controller 122 are shown as separate elements in the figure, this is by way of illustrative example only. In other embodiments, at least a portion of the functionality of the cryptography engine may be incorporated into the processor or the memory controller. For example, such functionality may be implemented at least in part in the form of one or more software programs that are stored in one of the memories 106, 120 and executed by the processor. As another example, the memory controller may be configured to incorporate the cryptography engine. The memory controller may also or alternatively be incorporated into the processor 104. Thus, the particular arrangement of system elements as shown in FIG. 1 should be viewed as exemplary only.

The term "processor" as used herein is intended to be construed broadly so as to encompass, for example, a microprocessor, central processing unit (CPU), digital signal processor (DSP), computer, application-specific integrated circuit (ASIC), or other type of processing device, as well as combinations of such devices. Such a processor may comprise internal memory, registers and other conventional elements.

The processing system 100 may further include other elements not explicitly shown in the figure, but commonly included in conventional implementations of SOCs, computers or other processing systems. For example, the SOC 102 may further comprise an additional memory controller for interfacing the processor 104 with the on-chip memory 106. These and other conventional elements, being well understood by those skilled in the art, will not be described in detail herein.

The processor 104 operates in conjunction with the memory controller 122 to control the encryption of data blocks by the cryptography engine 108 for secure storage in the off-chip memory 120. For each data block that is encrypted by encryption circuitry 110, a corresponding MAC is generated by MAC circuitry 114. In conjunction with transferring a given encrypted data block and its associated MAC to the off-chip memory for storage, the processor or memory controller modifies the storage address so as to permit the MACs to be stored in-line with their respective encrypted data blocks. Generally, if the encrypted data block is to be stored at a particular target address in the off-chip memory, the address modification process alters the target address to a modified address based on a predetermined factor that permits in-line storage of the MAC with the encrypted data block in the off-chip memory. The encrypted data block is then stored with its MAC at the modified address. This address modification process is repeated for other encrypted data blocks and their respective MACs, thereby providing in-line storage of the MACs with the encrypted data blocks in the off-chip memory.

In this illustrative embodiment, the address modification process may adjust the target address by a factor given by:

$$\frac{N+M}{N},$$

where N denotes the number of k-bit elements in the encrypted data block, and M denotes the number of k-bit elements in the MAC, where k is a power of 2. For example, in one implementation, the data block to be encrypted comprises eight 32-bit words, or a total of 256 bits. The encryption process in this example does not alter the length of the block, so the encrypted data block also comprises eight 32-bit words. The MAC comprises one 32-bit word, and thus the MAC overhead is 32 bits for every 256 bits of encrypted data, or one-eighth. The values of N, M and k in this example are 8, 1 and 32, respectively. The factor used to modify the target address to permit in-line storage of the MACs with the encrypted data blocks in this example is therefore given by:

$$\frac{8+1}{8}=\frac{9}{8}.$$

This factor is applied to the target address by multiplying the address by nine and then dividing the result by eight. A multiply by nine is a very inexpensive logic operation, and can be achieved with a single addition. More particularly, with reference to an address A, the multiplication $9*A=8*A+A$, where multiplying by a power of two (8) involves only a simple bit-shifting operation. Similarly, the above-noted division by a power of two (8) also involves only a simple bit-shifting operation. Accordingly, determination of the modified address from the target address can be achieved with minimal processing. The determination of the modified address can be made, for example, using software running on the processor 104, or using associated logic circuitry implemented in the processor, the memory controller 122, or other system element.

Figure 2:
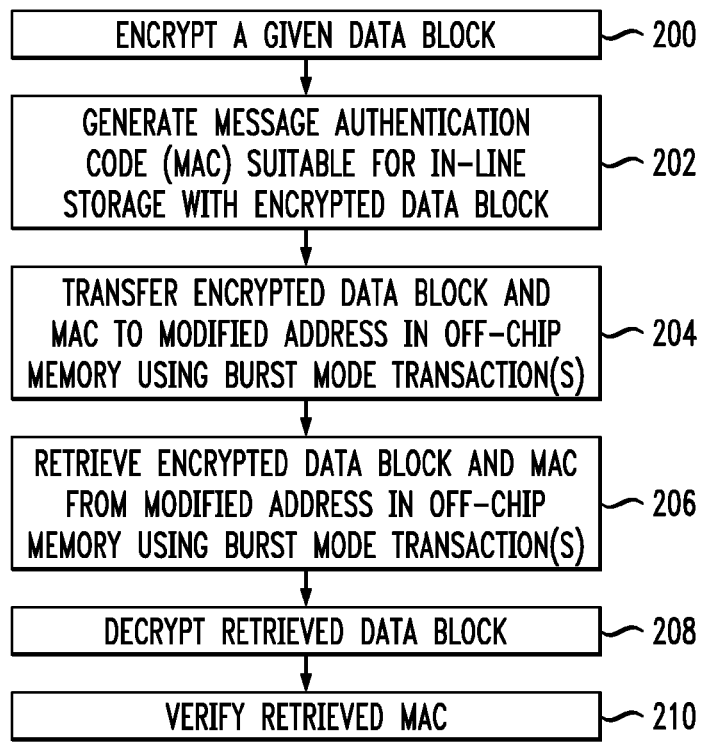
FIG. 2 is a flow diagram of a process for secure off-chip data storage in the FIG. 1 system.

FIG. 2 shows one embodiment of a process for secure off-chip data storage in the FIG. 1 system. The process in this embodiment includes steps 200 through 210.

In step 200, a given data block is encrypted utilizing the encryption circuitry 110 of the cryptography engine 108 in FIG. 1.

In step 202, a MAC suitable for in-line storage with the encrypted data block is generated utilizing the MAC circuitry 114 of the cryptography engine 108.

In step 204, the encrypted data block and its associated MAC are transferred to a modified address in off-chip memory 120 using one or more burst transactions. The modified address is obtained by applying a designated factor to a corresponding target address in the manner described above. The target address may be specified in an instruction or other storage request that directs storage of the data block at a particular location in the off-chip memory. Such a storage request can be a conventional storage request which assumes separate rather than in-line storage of an associated MAC. The term "target address" may be viewed as an example of what is more generally referred to herein as a "first address." It is such a first address that is modified to obtain a modified address suitable for storage and retrieval of a given encrypted data block and its associated MAC.

It should be understood that a given burst transaction may be a write transaction or a read transaction. In the context of step 204, which involves the transfer of an encrypted data block and its associated MAC to off-chip memory, the one or more burst transactions are write transactions. One or more burst transactions used for subsequent retrieval of the encrypted data block and its associated MAC from the off-chip memory, as in step 206 to be described below, will of course involve read transactions.

As noted previously, the address modification process advantageously allows in-line storage of MACs with their corresponding encrypted data blocks. Thus, a given encrypted block and its associated MAC will often be stored in a common row of a memory having an array of memory elements arranged in rows and columns, so as to be retrievable together using one or more burst transactions, rather than using multiple separate transactions directed to different portions of memory to retrieve the encrypted data block and its MAC. The burst mode transactions may be, for example, page-mode transactions in dynamic random access memory (DRAM), block transfers over a peripheral component interconnect (PCI)-type bus, or other types of transactions. As a more particular example, in the above-described arrangement in which the encrypted data block comprises eight 32-bit words and the MAC comprises one 32-bit word, the encrypted data block and the MAC may be transferred to the memory utilizing three four-word burst transactions. The processing overhead associated with one or more burst mode transactions directed to a common row in memory is significantly less than that associated with two separate transactions to different portions of memory.

Multiple data blocks may of course be processed and stored in the off-chip memory 120 utilizing steps 200 through 204. After these data blocks are securely stored, one or more of the blocks may be retrieved from the off-chip memory and validated utilizing steps 206 through 210, as will now be described.

In step 206, a given encrypted data block and its associated MAC are retrieved from the modified address in the off-chip memory 120 using one or more burst transactions. The modified address in this retrieval operation may be determined by applying the above-described designated factor to a target address of a corresponding retrieval request. Thus, the target address in the retrieval request directed to the given data block is modified in the same way used to modify the target address in a storage request in step 204.

In step 208, the encrypted data block retrieved from the modified address is decrypted utilizing decryption circuitry 112 of the cryptography engine 108.

In step 210, the retrieved MAC is verified by comparing it to a MAC generated from the retrieved encrypted data block. The MAC generation and comparison operations may be implemented in the MAC circuitry 114. The cryptography engine 108 can notify the processor of any detected tampering using appropriate interrupts or other types of messages.

Again, multiple encrypted data blocks and their associated MACs can be retrieved from off-chip memory 120 and processed utilizing steps 206 through 210.

It is to be appreciated that the particular process steps shown in FIG. 2 are not requirements of the invention, and alternative embodiments may utilize other operations for providing storage and retrieval of encrypted data blocks with in-line MACs.

Figure 3:
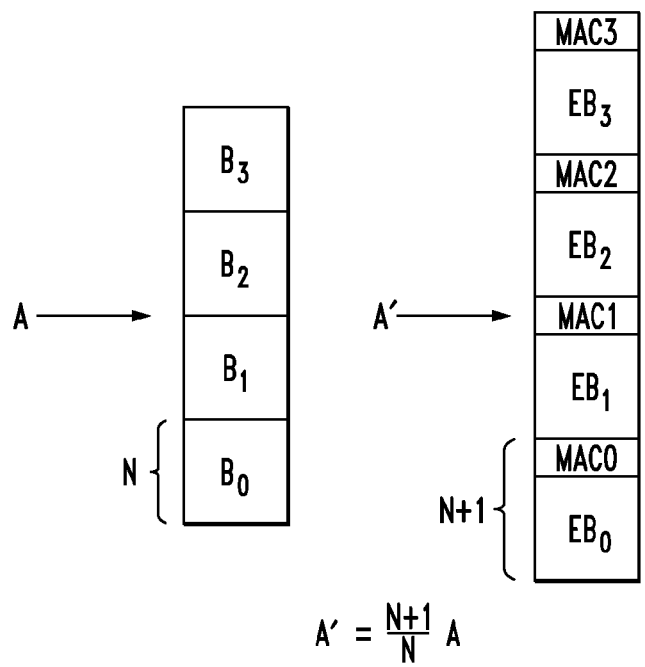
FIG. 3 is a diagram illustrating one possible implementation of the FIG. 2 process in the FIG. 1 system.

FIG. 3 illustrates the address modification associated with in-line storage of MACs in an illustrative embodiment of the invention. In this embodiment, each of the data blocks to be encrypted comprises an N-word block. These unencrypted blocks are denoted $B_0$, $B_1$, $B_2$ and $B_3$ as shown. The target address for storage of a given one of the data blocks is denoted as address A, which is generally an address that would be used to access the given data block if the blocks were stored sequentially without in-line MACs.

The encryption process yields encrypted data blocks denoted $EB_0$, $EB_1$, $EB_2$ and $EB_3$, which are assumed to be the same length as the unencrypted data blocks. MACs denoted $MAC_0$, $MAC_1$, $MAC_2$ and $MAC_3$ are generated for the respective encrypted data blocks $EB_0$, $EB_1$, $EB_2$ and $EB_3$. Each of the MACs in this embodiment comprises a single word, that is, M=1. The MACs are stored in-line with the encrypted data blocks, resulting in the sequence $EB_0$, $MAC_0$, $EB_1$, $MAC_1$, $EB_2$, $MAC_2$, $EB_3$, $MAC_3$ as shown in the figure. Thus, in this in-line storage arrangement, the encrypted data blocks are individually interspersed with the MACs. Other embodiments of the invention may utilize other types of interspersing or in-line storage of encrypted data blocks and their respective MACs.

In order to store or retrieve a given encrypted data block and its associated MAC, the target address A is adjusted by a factor given by:

$$\frac{N+1}{N}$$

to obtain a modified address A'. The modified address is then used to store or retrieve the encrypted data block and its associated MAC.

Figure 4A:
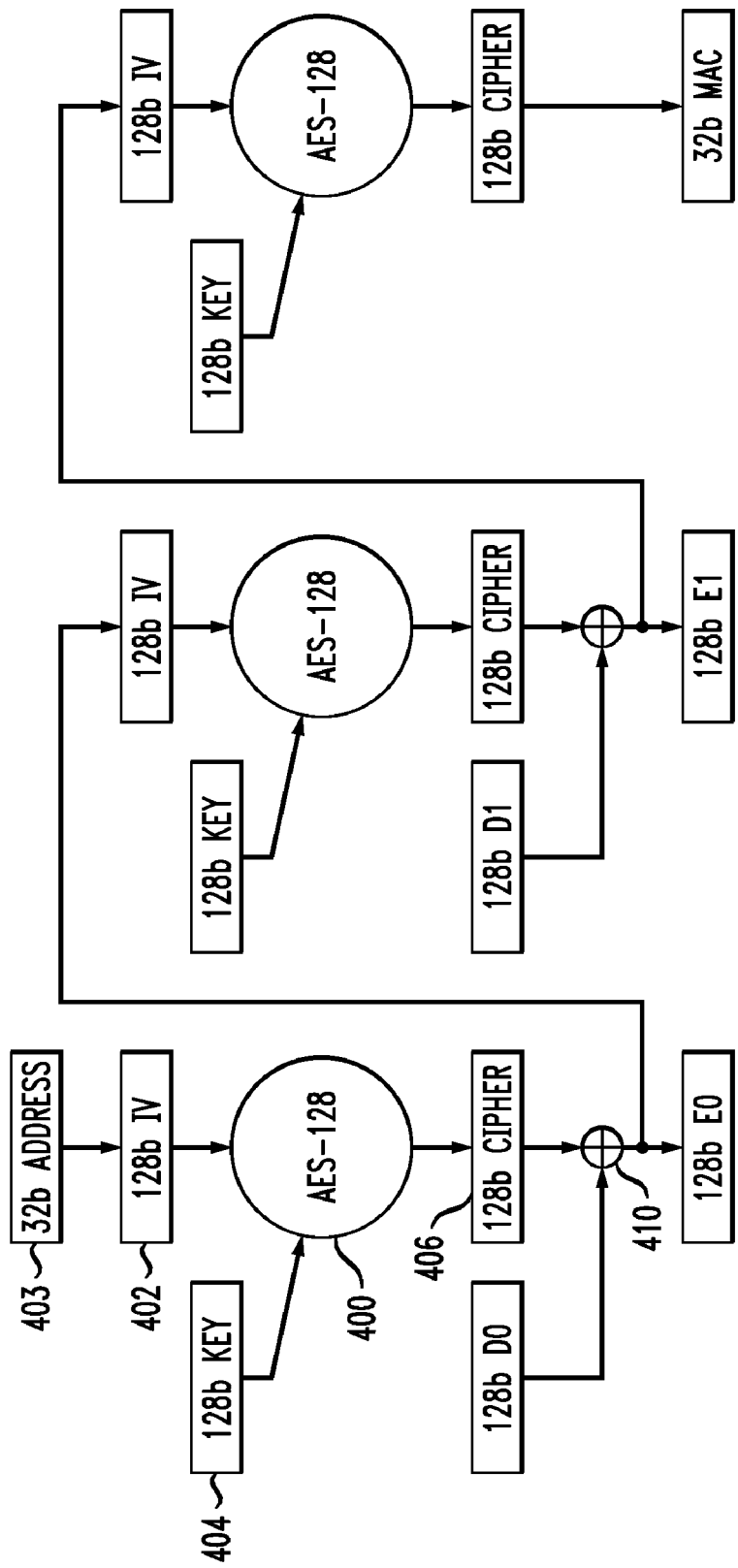
FIGS. 4A and 4B are diagrams illustrating respective encryption and decryption operations with corresponding MAC generation and verification as implemented in the FIG. 1 system.
Figure 4B:
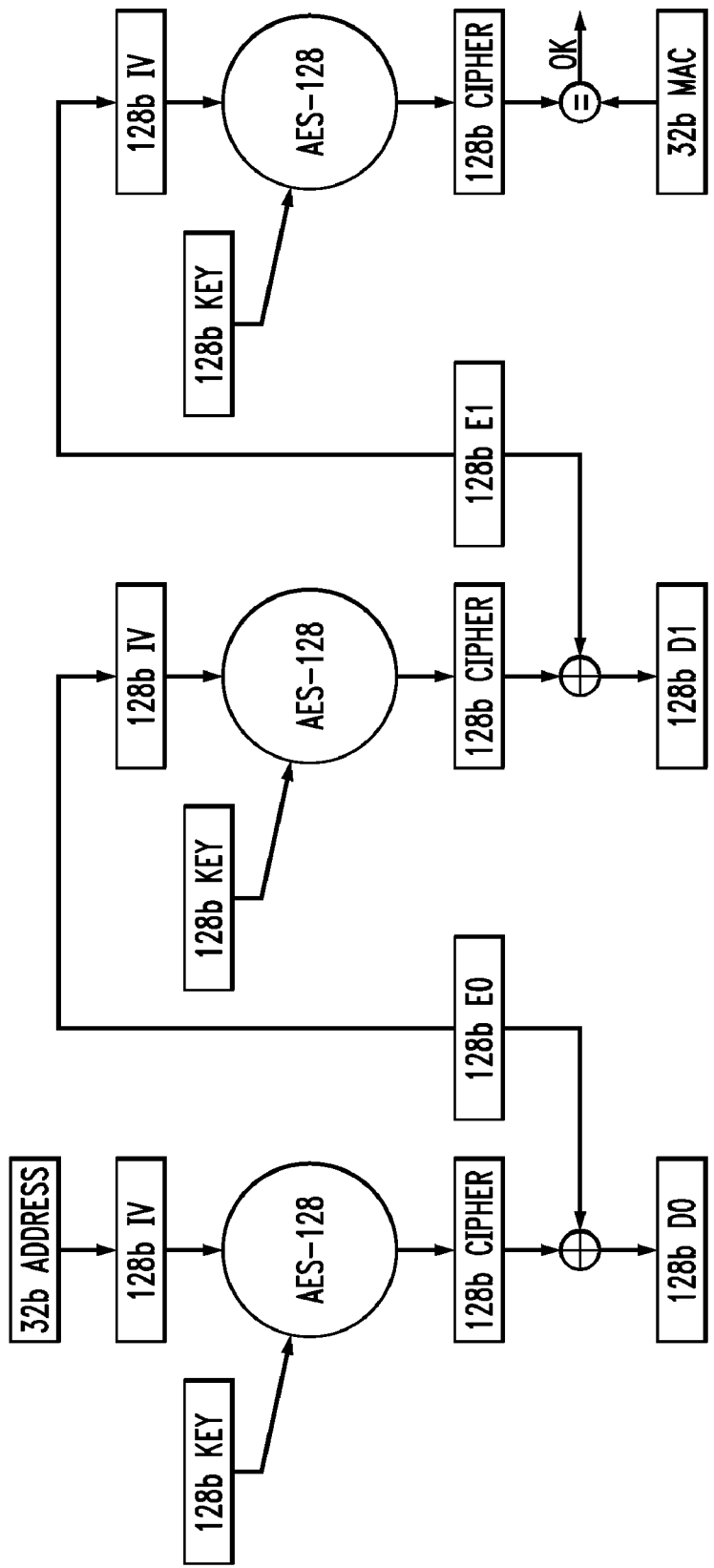

FIGS. 4A and 4B show examples of respective encryption and decryption operations with corresponding MAC generation and verification that may be implemented in the circuitry 110, 112 and 114 of the cryptography engine 108 of the FIG. 1 system. In this embodiment, the encryption operation is also used to generate the MAC, via a cipher feedback (CFB) arrangement. The resulting MAC is difficult for an adversary to compute and has good collision properties. While many other encryption standards may be used, this particular embodiment is based on the AES-128 algorithm. The circuitry elements 110, 112 and 114 of the cryptography engine 108 as shown include an AES-128 encryption function 400 that is utilized not only in performing encryption and MAC generation, but also in performing decryption and MAC verification. Each instance of the AES-128 encryption function shown in FIGS. 4A and 4B may be performed using the same hardware, software or other processing elements of cryptography engine 108. Thus, these illustrative arrangements repeatedly apply the same AES-128 encryption function in the manner shown. Each instance of application of the AES-128 encryption function takes as its inputs a 128-bit initialization vector (IV) and a 128-bit secret key and produces as its output a 128-bit cipher.

It will be assumed for purposes of illustration that the encryption and decryption operations of FIGS. 4A and 4B are applied to a 256-bit data block, with the AES-128 encryption function 400 separately processing each of two 128-bit halves of the data block.

Referring now specifically to FIG. 4A, the encryption of a given 256-bit data block comprising two 128-bit halves D0 and D1 is shown. A first initialization vector 402 is formed by padding out a 32-bit address 403 of the data block to 128 bits. The AES-128 encryption function 400 receives as its inputs the 128-bit initialization vector 402 and a 128-bit secret key 404, and generates as its output a 128-bit cipher 406. The cipher is then combined with D1 in combiner 410 using an exclusive-or (XOR) operation, to create the first 128-bit half E0 of encrypted data. The encrypted data E0 is then used as the initialization vector for a second iteration through the AES-128 encryption function 400 to create a second cipher which is combined with D1 using an XOR operation, to create the second 128-bit half E1 of encrypted data. Finally, E1 is used as an initialization vector for a third pass through the AES-128 encryption function 400 to produce a third 128-bit cipher. Since the AES-128 encryption function does a very good job of spreading the information across all 128 bits of cipher output, any 32-bit subfield of the 128-bit cipher is equally representative of the input data and can be used as a MAC.

FIG. 4B shows the corresponding CFB decryption and MAC verification as implemented using three passes through the AES-128 encryption function 400. Again, an initialization vector is formed by padding out a 32-bit address of the data block to 128 bits. The AES-128 encryption function 400 receives as its inputs the 128-bit initialization vector and the 128-bit secret key, and generates as its output a 128-bit cipher. The cipher is combined with the first 128-bit half E0 of the encrypted data block to recover D0. The first 128-bit half E0 is also used as an initialization vector for the second pass through the AES encryption function. This generates a 128-bit cipher that is combined with the second 128-bit half E1 of the encrypted data block to recover D1. This cipher is used as an initialization vector for a third pass through the AES-128 encryption function to generate a third cipher which includes a recomputed MAC. This recomputed MAC is compared with the MAC retrieved with the encrypted data block, and if the two MACs are equivalent the data block is considered valid and an indication to that effect is generated and provided to the processor, memory controller or other system element.

The particular processing arrangements shown in FIGS. 4A and 4B should be viewed as just one illustrative example of a cryptography engine suitable for use in the processing system of FIG. 1. It is to be understood that the invention can be implemented using other types and configurations of cryptography engines, using a wide variety of different hardware, software and firmware components. For example, it was noted above that at least a portion of the cryptography engine 108 could be implemented in the form of one or more software programs executed by the processor 104, or could be incorporated into the memory controller 122.

The illustrative embodiments described above advantageously allow MACs to be stored in-line with their respective encrypted data blocks, thereby reducing the processing overhead associated with providing secure off-chip data storage. For example, as a result of the in-line storage arrangements of the illustrative embodiments, a given encrypted data block and its associated MAC will often be stored in a common row of a memory, so as to be easily retrievable using one or more burst transactions.

It should again be emphasized that the above-described embodiments are intended to be illustrative only. For example, the processing system configuration and address modification process can be altered in other embodiments. As another example, the particular configuration of an encrypted data block and its associated MAC can be varied to accommodate the needs of a given application. Also, the particular types of encryption and decryption operations that are utilized, and the corresponding MAC generation and verification, can be varied in alternative embodiments. These and numerous other alternative embodiments within the scope of the following claims will be readily apparent to those skilled in the art.

We claim:

1. A method comprising the steps of:
   encrypting a given data block;
   generating a message authentication code for the encrypted data block;
   determining a first address for storage of the encrypted data block in a memory;
   modifying the first address to permit in-line storage of the message authentication code with the encrypted data block in the memory; and
   transferring the encrypted data block and the message authentication code to the memory for storage at the modified address instead of at the first address;
   wherein the first address is specified in a request that directs storage of the encrypted data block at the first address in the memory.

2. The method of claim 1 wherein the transferring step includes transferring the encrypted data block and the message authentication code to the memory utilizing one or more burst transactions.

3. The method of claim 1 wherein the steps are implemented by a system on a chip and the memory comprises an off-chip memory relative to said system.

4. The method of claim 3 wherein the encrypting and generating steps are implemented in a cryptography engine that is part of the system on a chip.

5. The method of claim 1 wherein the encrypting step utilizes cipher feedback encryption based on a designated encryption algorithm to encrypt the given data block.

6. The method of claim 5 wherein the message authentication code is generated by applying the designated encryption algorithm to an initialization vector comprising a portion of the encrypted data block.

7. The method of claim 5 wherein the designated encryption algorithm comprises an AES-128 encryption algorithm.

8. The method of claim 1 wherein the encrypted data block and the message authentication code are stored in a common row of the memory.

9. The method of claim 1 further including the steps of:
   receiving a request to retrieve the encrypted data block from the first address in the memory;
   modifying the first address to obtain the modified address;
   retrieving the encrypted data block and the message authentication code from the modified address in the memory;
   decrypting the encrypted data block; and
   verifying the message authentication code.

10. A non-transitory machine-readable storage medium having encoded therein machine-executable instructions that when executed implement the steps of the method of claim 1.

11. A method comprising the steps of:
encrypting a given data block;
generating a message authentication code for the encrypted data block;
determining a first address for storage of the encrypted data block in a memory;
modifying the first address to permit in-line storage of the message authentication code with the encrypted data block in the memory; and
transferring the encrypted data block and the message authentication code to the memory for storage at the modified address instead of at the first address;
wherein the step of modifying the first address comprises adjusting said first address by a factor given by:

$$\frac{N+M}{N},$$

where N denotes the number of k-bit elements in the encrypted data block, and M denotes the number of k-bit elements in the message authentication code, where k is a power of 2.

12. The method of claim 11 wherein k≧8 and M=1.

13. The method of claim 12 wherein k=32, N=8 and M=1.

14. A method comprising the steps of:
encrypting a given data block;
generating a message authentication code for the encrypted data block;
determining a first address for storage of the encrypted data block in a memory;
modifying the first address to permit in-line storage of the message authentication code with the encrypted data block in the memory; and
transferring the encrypted data block and the message authentication code to the memory for storage at the modified address instead of at the first address;
wherein the transferring step includes transferring the encrypted data block and the message authentication code to the memory utilizing one or more burst transactions; and
wherein the encrypted data block comprises a plurality of words and the message authentication code comprises at least one word, and further wherein the encrypted data block and the message authentication code are transferred to the memory utilizing a plurality of multi-word burst transactions.

15. A method comprising the steps of:
receiving a request to retrieve an encrypted data block from a first address in a memory;
modifying the first address to obtain a modified address;
retrieving the encrypted data block and a corresponding message authentication code stored in-line with the encrypted data block from the modified address in the memory;
decrypting the encrypted data block; and
verifying the message authentication code.

16. The method of claim 15 wherein the retrieving step includes retrieving the encrypted data block and the message authentication code from the memory utilizing one or more burst transactions.

17. An apparatus comprising:
a processor configured to communicate with a memory; and
a cryptography engine associated with the processor;
the processor being operative to control the cryptography engine to perform encryption of a given data block and generation of a message authentication code for the encrypted data block;
wherein the processor is further operative to determine a first address for storage of the encrypted data block in the memory; to modify the first address to permit in-line storage of the message authentication code with the encrypted data block in the memory; and to transfer the encrypted data block and the message authentication code to the memory for storage at the modified address instead of at the first address; and
wherein the first address is specified in a request that directs storage of the encrypted data block at the first address in the memory.

18. The apparatus of claim 17 wherein the processor communicates with the memory via a memory controller that implements at least a portion of the cryptography engine.

19. The apparatus of claim 17 wherein the processor is an element of a system on a chip and the memory comprises an off-chip memory relative to said system.

20. A processing system comprising:
a processor;
a cryptography engine associated with the processor; and
a memory coupled to the processor;
wherein the cryptography engine is configured to encrypt a given data block and to generate a message authentication code for the encrypted data block; and
wherein the processor is configured to determine a first address for storage of the encrypted data block in the memory; to modify the first address to permit in-line storage of the message authentication code with the encrypted data block in the memory; and to transfer the encrypted data block and the message authentication code to the memory for storage at the modified address instead of at the first address; and
wherein the first address is specified in a request that directs storage of the encrypted data block at the first address in the memory.

21. A method comprising the steps of:
encrypting a given data block;
generating a message authentication code for the encrypted data block;
determining a first address for storage of the encrypted data block in a memory;
modifying the first address to permit in-line storage of the message authentication code with the encrypted data block in the memory; and
transferring the encrypted data block and the message authentication code to the memory for storage at the modified address instead of at the first address;
wherein the first address is determined for storage of the encrypted data block without in-line storage of the message authentication code.

* * * * *